US012775404B2

(12) United States Patent
Alam et al.

(10) Patent No.: US 12,775,404 B2
(45) Date of Patent: Oct. 27, 2026

(54) MEMORY FOR ARTIFICIAL INTELLIGENCE APPLICATION AND METHODS THEREOF

(71) Applicant: Everspin Technologies, Inc., Chandler, AZ (US)

(72) Inventors: Syed M. Alam, Austin, TX (US); Sanjeev Aggarwal, Scottsdale, AZ (US); Kerry Joseph Nagel, Scottsdale, AZ (US)

(73) Assignee: Everspin Technologies, Inc., Chandler, AZ (US)

( * ) Notice: Subject to any disclaimer, the term of this patent is extended or adjusted under 35 U.S.C. 154(b) by 0 days.

(21) Appl. No.: 18/968,200

(22) Filed: Dec. 4, 2024

(65) Prior Publication Data

US 2025/0190127 A1 Jun. 12, 2025

Related U.S. Application Data

(60) Provisional application No. 63/607,407, filed on Dec. 7, 2023.

(51) Int. Cl.
*G06F 3/06* (2006.01)

(52) U.S. Cl.
CPC .......... *G06F 3/0625* (2013.01); *G06F 3/0653* (2013.01); *G06F 3/067* (2013.01)

(58) Field of Classification Search
CPC ...... G06F 3/0625; G06F 3/0653; G06F 3/067; G06N 3/048; G06N 3/063; G11C 7/1006; G11C 11/16; G11C 11/54
See application file for complete search history.

(56) References Cited

U.S. PATENT DOCUMENTS 11,797,467 B2 * 10/2023 Liu .......................... G06N 3/04
2019/0180173 A1 6/2019 Torng et al.
2019/0363131 A1 11/2019 Torng et al.
2020/0185027 A1 * 6/2020 Rom ....................... G11C 11/54
2020/0264974 A1 * 8/2020 Ram ................... G11C 11/5642
(Continued)

FOREIGN PATENT DOCUMENTS

EP 3789925 A1 3/2021
EP 4242927 A1 9/2023

*Primary Examiner* — Michael Krofcheck
(74) *Attorney, Agent, or Firm* — Bookoff McAndrews, PLLC

(57) ABSTRACT

An artificial neural network device, including input circuitry configured to provide input data into a neuron, weight operation circuitry configured to input a weight value into the neuron, bias operation circuitry configured to input a bias value into the neuron, activation function circuitry configured to receive an output of the bias operation circuitry and output an activation function output; and a storage device including storage circuitry electrically connected to the weight operation circuitry, the bias operation circuitry, and the activation function circuitry, wherein the input circuitry, the weight operation circuitry, the bias operation circuitry, and the activation function circuitry are operated based on code data, and wherein the storage device includes a plurality of storage portions, each storage portion of the plurality of storage portions configured to store one or more of the code data, the input data, the weight value, the bias value, or the activation function output.

20 Claims, 7 Drawing Sheets

(56) References Cited

U.S. PATENT DOCUMENTS

| | | | |
|---|---|---|---|
| 2021/0365333 | A1 | 11/2021 | Sun et al. |
| 2022/0108759 | A1* | 4/2022 | Tran ..................... G06N 3/0464 |
| 2022/0399050 | A1* | 12/2022 | Troia ...................... G11C 11/54 |
| 2023/0281434 | A1 | 9/2023 | Alam et al. |

* cited by examiner

MEMORY FOR ARTIFICIAL INTELLIGENCE APPLICATION AND METHODS THEREOF

CROSS-REFERENCE TO RELATED APPLICATION

This application claims the benefit of U.S. Provisional Patent Application No. 63/607,407, filed Dec. 7, 2023, the entire contents of which are incorporated herein by reference.

TECHNICAL FIELD

Embodiments of the present disclosure relate to, among other things, a memory storage device used in connection with neural network for artificial intelligence. More specifically, certain embodiments of the present disclosure relate to a memory storage device, including a plurality of storage portions, and configured to be used in connection with neural network for artificial intelligence.

BACKGROUND

An artificial neural network may have an input layer and an output layer with multiple hidden layers. Each layer following the input layer may have multiple hardware neurons that perform various operations. For example, each hardware neuron may perform multiplication and accumulation (MAC) operations with respect to inputs and weight values, summation of the product of the MAC operations with any bias values, and/or performance of an activation function, such as a rectified linear unit (ReLU) activation function or a sigmoid function for producing an output value to the output layer.

Some systems may include a network (e.g., artificial neural network), including hardware neurons, in a chip (e.g., an artificial intelligence (AI) chip). For some conventional hardware neurons, associated weight values and bias values may require memory operations such as storage operations, retrieval operations, modification operations, read operations, and/or write operations in these artificial neural network contexts. For example, in an inference operation, weight values and bias values for each hardware neuron may need to be stored in non-volatile memory off the chip. During use of the hardware neuron, weight values and bias values may be loaded from the off-chip non-volatile memory into on-chip random access memory (RAM) registers where the artificial neural network may be implemented. Off-chip memory access for weight values and bias values may add significant power consumption to the chip and/or increase latency in operations of the hardware neuron. Therefore, there may be a need for a configuration of a hardware neuron that reduces power consumption and latency typically associated with loading these values from non-volatile memory into a hardware neuron.

BRIEF DESCRIPTION OF THE DRAWINGS

In the course of the detailed description that follows, reference will be made to the appended drawings. The drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein; however, all permutations and combinations are considered to fall within the scope of the present inventions.

Figure 1:
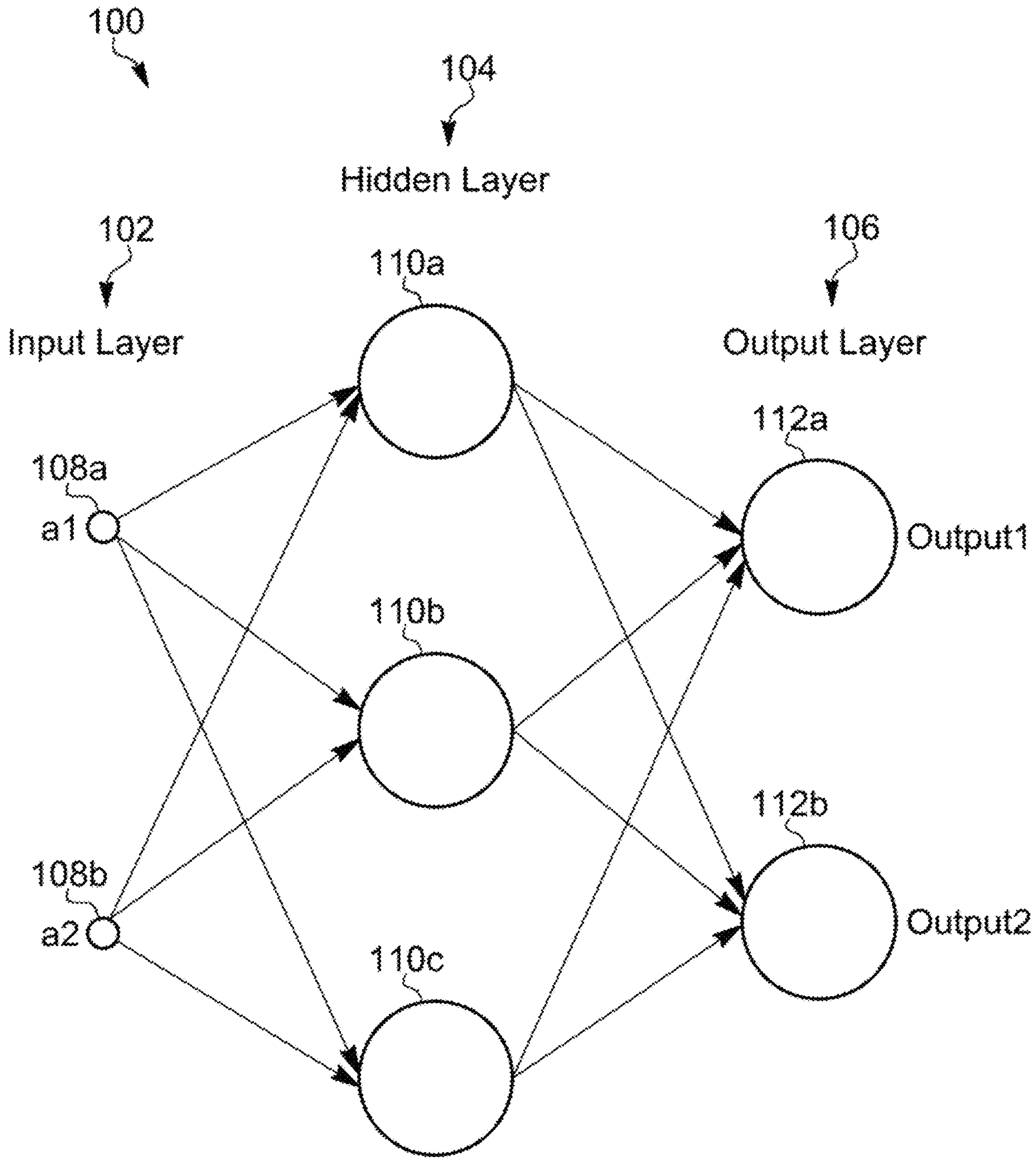
FIG. 1 depicts a functional diagram of an exemplary artificial neural network, according to some example embodiments.

There are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

DETAILED DESCRIPTION

Detailed illustrative aspects are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of exemplary embodiments described herein.

When the specification makes reference to "one embodiment" or to "an embodiment," it is intended to mean that a particular feature, structure, characteristic, or function described in connection with the embodiment being discussed is included in at least one contemplated embodiment of the present disclosure. Thus, the appearance of the phrases, "in one embodiment" or "in an embodiment," in different places in the specification does not constitute a plurality of references to a single embodiment of the present disclosure.

As used herein, the singular forms "a," "an," and "the" are intended to include the plural forms as well, unless the context clearly indicates otherwise. It also should be noted that in some alternative implementations, the features and/or steps described may occur out of the order depicted in the figures or discussed herein. For example, two steps or figures shown in succession may instead be executed substantially concurrently or may sometimes be executed in the reverse order, depending upon the functionality/acts involved. In some aspects, one or more described features or steps may be omitted altogether, or may be performed with an intermediate step therebetween, without departing from the scope of the embodiments described herein, depending upon the functionality/acts involved.

Further, the terms "first," "second," and the like, herein do not denote any order, quantity, or importance, but rather are used to distinguish one element from another. Similarly, terms of relative orientation, such as "top," "bottom," etc. are used with reference to the orientation of the structure illustrated in the figures being described. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

In one aspect, the present disclosure is directed to techniques and implementations to use a storage device (e.g., a memory), including a plurality of storage portions, in connection with a neural network for artificial intelligence. The storage device may be a non-volatile or "permanent" memory capable of maintaining data when a power supply is deactivated (e.g., magnetoresistive random-access memory (MRAMs), but embodiments are not limited thereto. Though the description below makes reference to MRAMs, the embodiments disclosed herein may be implemented in other storage devices including, but not limited to, dynamic random access memory (DRAM), electrically erasable programmable read-only memory (EEPROM), ferroelectric random-access memory (FRAM), resistive random access memory (RRRAM), and/or the like.

In some systems, an artificial neural network may include an input layer and an output layer. The input layer may receive one or more inputs to the artificial neural network. The inputs provided via the input layer may be applied to one or more hidden layers comprising hardware neurons. The one or more hidden layers may be trained based on supervised, semi-supervised, or unsupervised machine learning. Each neuron may have multiple components (e.g., weights, biases, layers, etc.) stored in a memory (e.g., storage device). During a training process to train the artificial neural network, the components of the one or more hardware neurons may be accessed, modified, deleted, re-written, added, and/or the like. Accordingly, a large amount of memory access may be required during an artificial neural network training process. Additionally, during an inference application of a trained artificial neural network, components of hardware neurons may be accessed, and/or applied, via respective memory access. Additionally, an artificial neural network may continue training (e.g., re-training) during a learning operation (e.g., based on feedback). Accordingly, components of hardware neurons may be modified, deleted, and/or added during a learning application. In some systems, multiple components (e.g., weights or biases) of each neuron may have to be stored in a non-volatile memory. Conventionally, this is done by storing the weights or biases in an off-chip memory storage (e.g., external memory such as flash memory). Data from external memory may be loaded into artificial neural network processors prior to inference application and stored in locally available volatile storage elements. Additional power consumption of moving data and storage elements may be needed in this conventional approach.

One or more of the problems described above may be solved by certain embodiments described herein. For example, power consumption, computational resources, and/or time (e.g., delay) may be reduced based on the distributed storage (e.g., MRAM) architecture and method of operating a device of an artificial neural network disclosed herein. Certain embodiments disclosed herein may mitigate power consumption, computational resources, and/or latency by providing on-chip or near-chip access to the artificial neural network components (e.g., weight values, bias values, processing layers, etc.) and, more particularly, certain embodiments disclosed herein may include identifying different storage characteristics that may be required by, or beneficial to, different types of data processed by the artificial neural network (e.g., input values, weight values, bias values, activation function output) and implementing a storage device with a plurality of storage portions, each storage portion dedicated to a corresponding data type and configured to support a corresponding set of storage characteristics. In the case of on-chip access, certain embodiments may reduce the amount of routing needed to provide values from storage to processing circuitry, which may conserve chip space, reduce or eliminate circuitry from the artificial neural network, etc.

FIG. 1 depicts a functional diagram of an exemplary artificial neural network, according some example embodiments. An artificial neural network 100 may include an input layer 102, a hidden layer 104 (e.g., may be more than one hidden layer), and an output layer 106. The input layer 102 may provide input values 108*a* and 108*b* to the hidden layer 104, which may process the input values 108*a* (a1) and 108*b* (a2). The hidden layer 104 may include one or more hardware neurons 110 (also referred to herein as neuron devices) for performing the processing by using network component data. The hidden layer 104 may provide a result of the processing to the output layer 106 (e.g., to hardware neurons 112*a* and 112*b* of the output layer 106) for output to a device or user, for further processing, and/or the like, as depicted by "OUTPUT 1" and "OUTPUT 2."

As described in more detail herein, network component data (e.g., weight values, bias values, etc.) may be stored in non-volatile memory (or storage devices) and may be used during operations of the artificial neural network 100. For example, weight values may be associated with each arc (or synapse) between the input layer 102 and the hidden layer 104 and between the hidden layer 104 and the output layer 106. The arcs are illustrated in FIG. 1 as arrows between those layers. Additionally, or alternatively, bias values may be associated with each hardware neuron 110*a*, 110*b*, 110*c*, 112*a*, and 112*b* in the artificial neural network 100.

Although certain embodiments may be described herein in the context of an artificial neural network 100, certain embodiments may be applicable to feedforward neural networks, radial basis function neural networks, Kohonen self-organizing neural networks, recurrent neural networks (RNNs), convolutional neural networks (CNNs), modular neural networks (MNNs), and/or the like.

Figure 2:
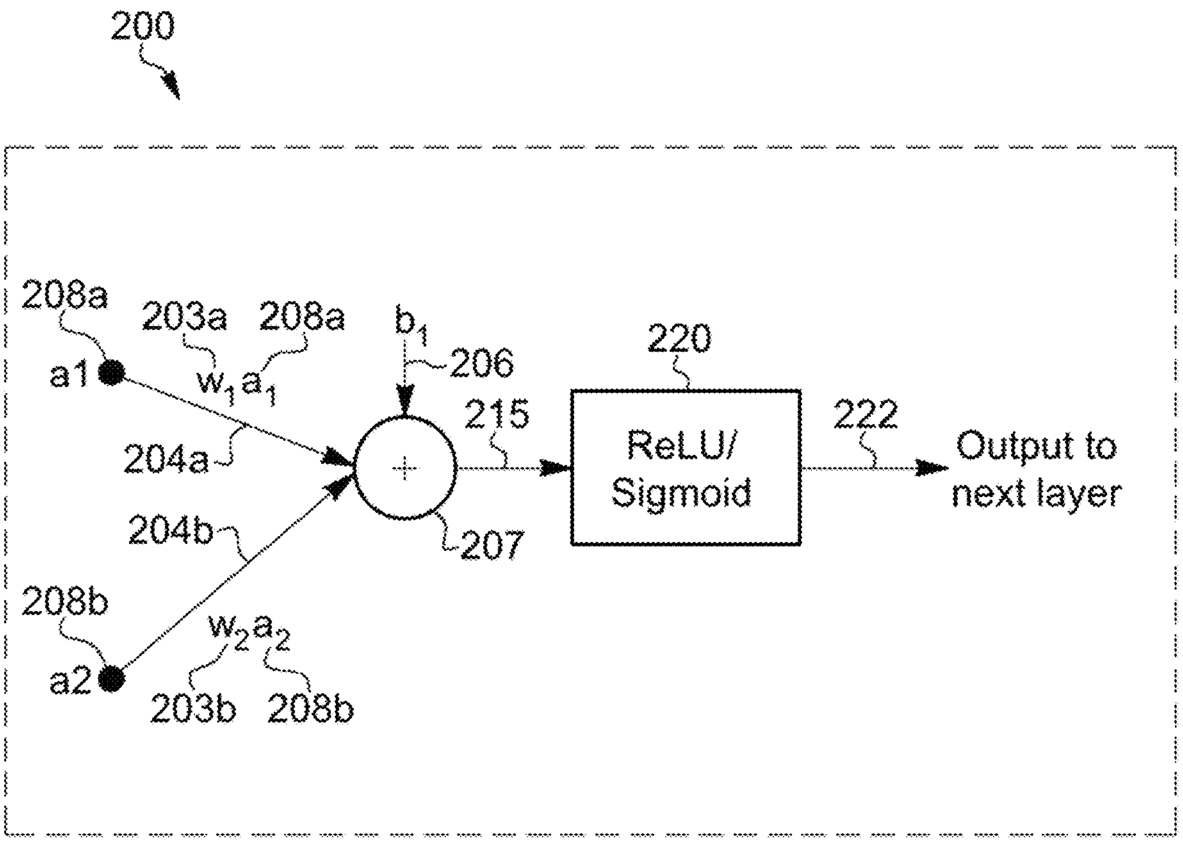
FIG. 2 depicts an example of a hardware neuron of an artificial neural network, according to some example embodiments

FIG. 2 depicts an example diagram of a hardware neuron in an artificial neural network, according to some example embodiments. A hardware neuron 200 may include a weight operation circuitry 204 (including weight operation circuitry 204*a* and 204*b*), a bias operation circuitry 207, weight values 203 (including weight values 203*a* and 203*b*), input values 208 (including input values 208*a* and 208*b*), a bias value 206, a biased weighted value 215, an activation function circuitry 220, and an activation function output 222. With reference to FIG. 1, the input values 208 may correspond to the input values 108 and the hardware neuron 200 may correspond to a hardware neuron in the hidden layer 104 or the output layer 106 (e.g., the hardware neuron 110*a*, 110*b*, 110*c*, 112*a*, or 112*b*). The hardware neuron 200 may be a part of a given neural network layer of the artificial neural network 100 in FIG. 1.

The hardware neuron 200 may include the weight operation circuitry 204, which may be configured to perform an operation on the input values 208, such as a multiplier operation (also known as a multiplication and accumulation (MAC) operation). For example, the multiplier operation may include multiplying the input values 208*a* and 208*b* received at the hardware neuron 200 by the weight values 203*a* and 203*b*, respectively, associated with the hardware neuron 200. The weight values 203*a* and 203*b* may be stored in a storage device (not depicted in FIG. 2) that may be proximate to, or implemented into (e.g., implemented on the same chip as), the hardware neuron 200. The input values 208*a* and 208*b* may also be stored in a storage device (not depicted in FIG. 2) that may be proximate to, or implemented into (e.g., implemented on the same chip as), the hardware neuron 200. The weight operation circuitry 204 may be configured to read the weight values 203*a* and 203*b* from the storage device and multiply the input values 208*a* and 208*b* by the weight values 203*a* and 203*b*, respectively. The weight operation circuitry 204 may be configured to multiply the input values 208*a* and 208*b* by the weight values 203*a* and 203*b* using a multiplier circuitry (not depicted in FIG. 2). For example, the weight operation circuitry 204 may multiply the input value 208*a* by the weight value 203*a* (e.g., $a_1*w_1$) and the input value 208*b* by the weight value 203*b* (e.g., $a_2*w_2$). In some embodiments, the weight values 203 may be updated based on performing a training and/or a re-training operation of the artificial neural network 100. Although FIG. 2 discloses that weight operation circuitry 204 is configured to perform the multiplier operation described above, some embodiments may include additional circuitry, such as an input circuitry separate from the weight operation circuitry 204. For example, an input circuitry (not depicted in FIG. 2) may be configured to provide the input values 208*a* and 208*b* from a storage device into the hardware neuron 200, separate from the weight operation circuitry 204.

The hardware neuron 200 may further include the bias operation circuitry 207, which may be configured to receive i) the bias value 206 from a storage device proximate to, or implemented into (e.g., implemented on the same chip as), the hardware neuron 200, and ii) the weighted values output from the weight operation circuitry 204, and perform an operation, such as an adder or summation operation. For example, the bias operation circuitry 207 may apply (e.g., add) the bias value 206 to the weighted values output from the weight operation circuitry 204. The bias value 206 may include one or more values. As discussed above, the bias value 206 may be stored in and retrieved from the storage device (not depicted in FIG. 2) that may be proximate to, or implemented into, the hardware neuron 200. The bias operation circuitry 207 may be configured to read the bias value 206 from the storage device and may add the bias value 206 to the weighted values output from the weight operation circuitry 204. In some embodiments, the bias operation circuitry 207 may add the bias value 206 to the weighted values using summation circuitry (not depicted in FIG. 2). As a specific example, the weighted value output from the weight operation circuitry 204 (e.g., the weighted value $[a_1*w_1]$ and/or the weighted value $[a_2*w_2]$) may be added to the bias value 206. As a result, the bias operation circuitry 207 may generate the biased weighted value 215 (e.g., sum $(a_1*w_1+b_1)$ and/or sum $(a_2*w_2+b_1)$). This operation may be referred to as a summation of the product with any bias.

The biased weighted value 215 output from the bias operation circuitry 207 may be provided to the activation function circuitry 220, which may be configured to apply a rectified linear unit (ReLU) activation function or a sigmoid activation function to the biased weighted value 215 to form an activation function output 222. The activation function output 222 may be provided (or output) to the output layer 106.

Although not depicted in FIG. 2, in one embodiment, the hardware neuron 200 may include one or more storage devices. In this way, the hardware neuron 200 and the one or more storage devices may be implemented on a same chip. In other embodiments, one or more storage devices may be implemented proximate to the hardware neuron 200, but may be implemented on a device or chip that is separate from that of the hardware neuron 200. In some embodiments, each of the one or more storage devices, which may be configured to store a particular data type, may be disposed or positioned proximate to an operation circuitry (e.g., the weight operation circuitry 204, the bias operation circuitry 207, the activation function circuitry 220) that is associated with that particular data type (e.g., that reads and/or outputs the data type). Each of the one or more storage devices may include non-volatile memory, such as MRAM bits, configured to store one or more of the input values 208*a*, 208*b*, the weight values 203*a*, 203*b*, the bias value 206, the activation function output 222, and/or code data including a set of instructions executed by one or more processors to perform the functions of the artificial neural network. For example, a storage device may be configured to store weight values 203*a* and 203*b*, which the weight operation circuitry 204*a* and 204*b* may read, respectively. As another example, a storage device may be configured to store the input values 208*a* and 208*b*, which the weight operation circuitry 204*a* and 204*b* may read, respectively. As another example, a storage device may be configured to store the bias value 206, which the bias operation circuitry 207 may read. As yet another example, a storage device may be configured to store the code data, which may be read and executed by one or more processors implementing the artificial neural network, to perform the functions associated with the artificial neural network.

In some embodiments, the artificial neural network 100 or the hardware neuron 200 may include one or more storage devices. In some embodiments, the artificial neural network 100 or the hardware neuron 200 may include a single storage device configured to store one or more of the weight values 203*a*, 203*b*, the bias value 206, the code data, the input values 208*a* and 208*b*, and/or the activation function output 222. For example, the storage device may include a plurality of storage portions, each configured to store one or more of the weight values 203*a*, 203*b*, the bias value 206, the code data, the input values 208*a* and 208*b*, and/or the activation function output 222. In some embodiments, the artificial neural network 100 including the hardware neuron 200, and the storage device, including a plurality of storage portions, may be integrated in a single chip. In some embodiments, the storage device may be integrated into or disposed proximate a chip including the artificial neural network 100 including the hardware neuron 200. In these ways, the hardware neuron 200 may be disposed proximate to the storage device, which may reduce power consumption and/or latency (e.g., delay) for reading and/or writing values from the storage device.

Figure 3:
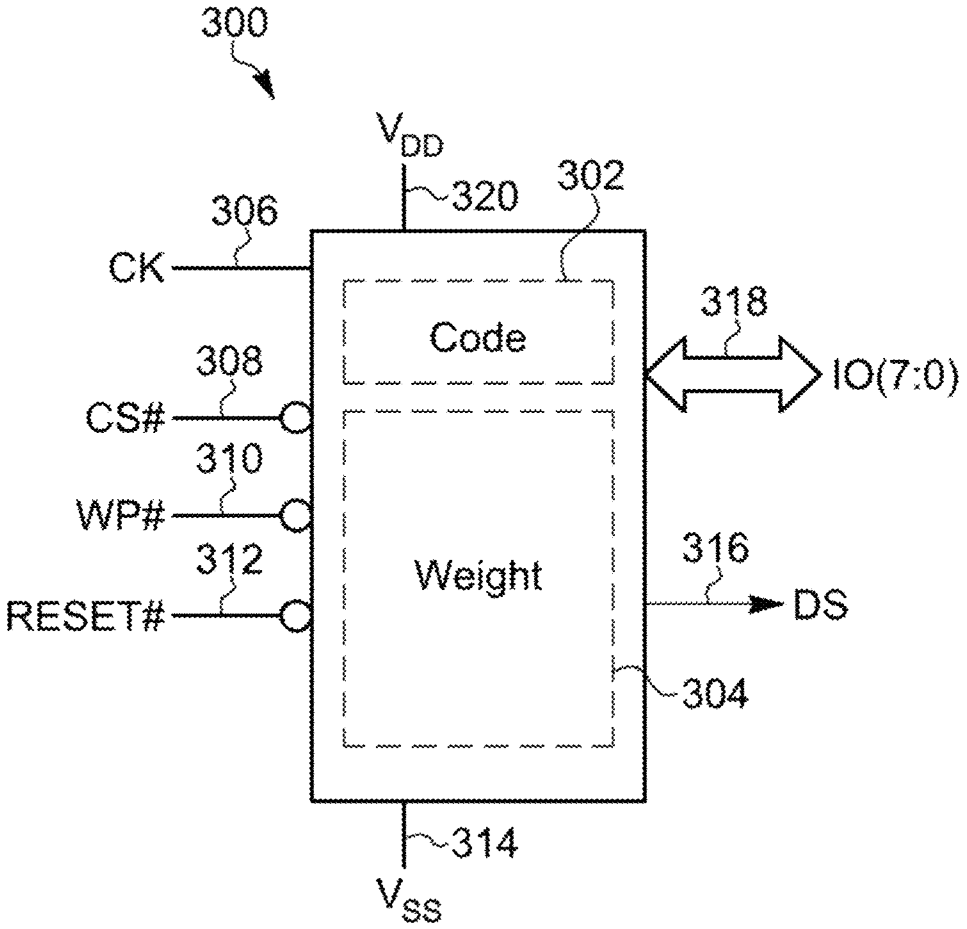
FIG. 3 depicts a storage device with a code storage portion and a weight storage portion, according to some example embodiments.

FIG. 3 depicts a storage device with a code storage portion and a weight storage portion, according to some example embodiments. Storage device 300 may be a memory chip including two or more storage portions, such as a first storage portion and a second storage portion. The storage device 300 may be the memory storage device discussed above with reference to FIG. 2. The storage device 300 may be, for example, an eXpanded Serial Peripheral Interface (xSPI) MRAM memory chip. In other embodiments, the storage device 300 may be a memory chip with a different interface, such as a parallel, Low Power Double Data Rate 4 extended (LPDDR4×) chip, or any other memory chip, chiplet, or known good die (KGD) suitable for the applications discussed in the present disclosure. As illustrated in FIG. 3, the storage device 300 may include a plurality of pins that provide connections to and/or from the storage device 300. For example, the storage device 300 may include a block pin 306 (CK), a chip select pin 308 (CS #), a write protect pin 310 (WP #), a reset pin 312 (RESET #), a negative power supply pin 314 ($V_{SS}$), a data strobe 316 (DS), an input/output pin 318 (10), and a positive power supply pin 320 (VDD), but embodiments are not limited thereto.

The first storage portion may be a storage portion configured to store a first data type associated with an artificial neural network. The first storage portion may be configured to support, or have, a first set of storage characteristics. Similarly, the second storage portion may be a storage portion configured to store a second data type associated with an artificial neural network, and support or have a second set of storage characteristics. For example, the first storage portion may be a code storage portion 302 configured to store code data, which may include instructions to be performed by one or more processors of the artificial neural network device. The code storage portion 302 of the storage device 300 may also provide the code data to the one or more processors of the artificial neural network device to perform corresponding instructions. The second storage portion may be a weight storage portion 304 configured to store the weight values 203*a* and 203*b*. In some embodiments, the weight storage portion 304 may be configured to store the weight values 203*a* and 203*b*, and the bias value 206. The weight storage portion 304 of the storage device 300 may also provide the weight values 203*a*, 203*b* and the bias value 206 to the weight operation circuitry 204 and the bias operation circuitry 207, respectively.

Although the storage device 300 depicted in FIG. 3 has two storage portions including a code storage portion 302 and a weight storage portion 304, the two storage portions are not limited to the code storage portion 302 and the weight storage portion 304. As will be explained in further detail, in one embodiment, the two storage portions may include a weight storage portion and a data storage portion (e.g., FIG. 4). In another embodiment, the two storage portions may include a code storage portion and a data storage portion (e.g., FIG. 5). In yet another embodiment, the storage device may include more than two storage portions. For example, the storage device may include three storage portions, comprising a code storage portion, a data storage portion, and a weight storage portion (e.g., FIG. 6).

The storage device 300 may be a non-volatile memory device. The storage device may be a magnetoresistive random-access memory (MRAM) device including a plurality of magnetic tunnel junctions (MTJs), but embodiments are not limited thereto.

Each storage portion of the storage device (e.g., storage device 300, 400, 500, or 600) may be configured to meet a set of performance specifications that may be unique compared to the other storage portion(s), based on the type(s) of data stored in the storage portion and how the data is used in the artificial neural network 100 during inference. For example, Table 1 below includes storage characteristics (e.g., performance specifications) of storage portions included in the storage device of the present disclosure.

TABLE 1

| Storage Portion | Read Endurance | Write Endurance | Bit Error Rate (BER) | Speed |
|---|---|---|---|---|
| Code Storage Portion | Unlimited | Medium (e.g., 1e5 to 1e7 cycles) | Very Low (e.g., less than (<) 1e-15) | Fast read Slow write |
| Data Storage Portion | Unlimited | High (e.g., more than (>) 1e10 cycles) | | Fast read Fast write |
| Weight Storage Portion | Unlimited | Low (e.g., less than (<) 1000 cycles) | Medium (e.g., 1e-6 to 1e-10) | Fast read Slow write |

With reference to Table 1 above, read endurance may refer to a number of read cycles that may be applied to a storage device or a storage portion thereof, before the storage becomes unreliable; write endurance may refer to a number of program/write cycles that may be applied to a storage device or a storage portion thereof, before the storage becomes unreliable; bit error rate (BER) may refer to a number of bit errors per time unit; and speed may refer to how long it takes to read data from, or write data to, a storage device or a storage portion thereof. With reference to Table 1, unlimited may refer to continuous read operation throughout the whole or a significant percentage (e.g., >70%) of a lifetime of the part; fast read may refer to 5 ns to 40 ns read latency; fast write may refer to 10 ns to 40 ns write latency; slow read may refer to >40 ns read latency; and slow write may refer to >40 ns write latency.

As described in Table 1, the storage device may include a weight storage portion configured to support and/or have a low write endurance (e.g., less than (<) 1000 write cycles). To account for the medium BER allowed for the weight storage portion, the low write endurance may be configured to include a first number of write cycles associated with (or dedicated for) an inference operation of the artificial neural network 100, and a second number of write cycles (e.g., <100 write cycles) associated with (or dedicated for) a re-training operation (or a partial training operation) of the artificial neural network 100. The first number of write cycles associated with (or dedicated for) an inference operation of the artificial neural network 100 may be greater than the second number of write cycles associated with (or dedicated for) a re-training (or partial training operation) operation of the artificial neural network 100.

As described in Table 1, the storage device may include a code storage portion configured to support and/or have an unlimited read endurance, a medium write endurance, a very low BER, a fast read speed, and a slow write speed, providing a customized storage for code data associated with the artificial neural network device. For example, the artificial neural network device may be configured to access the code data stored in the code storage portion a number of times (or many times, or an unlimited number of times) to execute instructions included in the code data using one or more processors of the artificial neural network device. The code data may not need to be updated (or written, or re-written) often. Based on these aspects of the code data, the code storage portion of the storage device may be configured to support or have the unlimited read endurance and the medium write endurance. Further, because the code data may be read more often than it may be written (or updated, or re-written), a fast read speed and a slow write speed may be beneficial (or suitable) for the code storage portion of the storage device. Furthermore, it may be beneficial for the code storage portion of the storage device to have the very low BER to avoid (or minimize, or reduce) an amount of errors in the code data, such that the functions of the artificial neural network are accurately performed for reliable results.

Still in reference to Table 1, the storage device may include a data storage portion configured to support and/or have an unlimited read endurance, a high write endurance, a very low BER, a fast read speed, and a fast write speed, providing a customized storage for input values and/or activation function outputs associated with the artificial neural network device. For example, the artificial neural network device may be configured to access the input values stored in the data storage portion a number of times (or many times, or an unlimited number of times) to "feed" the neural network during an inference stage, and the input values may need to be updated (or written, or re-written) often as new input values are received for processing. Based on these aspects, the data storage portion of the storage device may be configured to support or have the unlimited read endurance and the high write endurance. Activation function outputs generated by hardware neurons 200 may share similar characteristics to input values and therefore the data storage portion having the aforementioned characteristics may also be beneficial (or suitable) for the activation function outputs. Therefore, in some embodiments, the data storage portion can be an activation storage portion. Further, because the input values and/or the activation function outputs may be read and written often, the fast read speed and the fast write speed may be beneficial (or suitable) for the data storage portion of the storage device. Furthermore, it may be beneficial for the data storage portion of the storage device to have the very low BER to avoid (or minimize, or reduce) an amount of errors in the input values and/or the activation function outputs, ensuring the correct input values and activation function outputs are provided to corresponding components of the artificial neural network.

With continued reference to Table 1, the storage device may include a weight storage portion configured to support and/or have an unlimited read endurance, a low write endurance, a medium BER, a fast read speed, and a slow write speed, providing a customized storage for weight values and bias values associated with the artificial neural network device. For example, the artificial neural network device may be configured to access the weight values and/or the bias values stored in the weight storage portion a number of times (or many times, or an unlimited number of times) to provide those values to corresponding components of hardware neurons 200 in the artificial neural network during an inference stage, and the weight values and/or the bias values may not need to be updated (or written, or re-written) often during the inference stage. Based on these aspects, the weight storage portion of the storage device may be configured to support or have the unlimited read endurance and the low write endurance. Further, because the weight values may be read more often than it may be written (or updated, or re-written), a fast read speed and a slow write speed may be beneficial (or suitable) for the weight storage portion of the storage device. Furthermore, it may be beneficial for the weight storage portion of the storage device to have the medium BER (e.g., 1e-6 to 1e-10).

Furthermore, each storage portion of the storage device (e.g., storage device 300, 400, 500, or 600) may be architected and configured with specific elements or schemes to meet the performance specifications set for the corresponding storage portion (e.g., the performance specifications discussed above in reference to Table 1). For example, table 2 below includes storage characteristics of storage portions included in the storage device of the present disclosure.

TABLE 2

| Storage Portion | Memory I/O Scheme | Write Scheme | Error Correction Code (ECC) | MTJ (Storage Bit) Characteristics |
|---|---|---|---|---|
| Code Storage Portion | Standard Parallel, or Serial I/O, or High Speed | Write-verify | Strong ECC with High Number of Bits (e.g., 2 bits or more) Error Correction Code | High Energy Barrier (e.g., high data retention); Larger MTJ Size |
| Data Storage Portion | | Single Pulse Write | | Medium Energy Barrier; Lower Switching Current; Smaller MTJ Size |
| Weight | Wider IO (e.g., | Write- | Weak ECC (e.g., | High Energy |

TABLE 2-continued

| Storage Portion | Memory I/O Scheme | Write Scheme | Error Correction Code (ECC) | MTJ (Storage Bit) Characteristics |
|---|---|---|---|---|
| Storage Portion | more than (>) x256 IO) for Parallel Access of Large Number of Bits | Verify | no correction or 1-bit correction) | Barrier (e.g., high data retention); Larger or Medium MTJ Size |

With reference to Table 2 above, memory I/O scheme may refer to a method of interacting with input/output (I/O) devices; write scheme may refer to a specific method or protocol used to write data to a storage device or a storage portion thereof; error correction code (ECC) scheme may refer to a method of detecting and correcting errors that occur in a storage device or a storage portion thereof, using codes such as parity bits; and MTJ characteristics may refer to features, attributes, qualities, and/or specifications of MTJs in a storage device or a storage portion thereof. Further in reference to Table 2, Standard Parallel memory I/O scheme may refer to a method of performing multiple input/output operations simultaneously (transferring bits simultaneously) (up to ×32); Serial I/O may refer to a method of transferring data serially one bit at a time in each 10 (up to ×16); High Speed may refer to a method of using dedicated circuitry to transfer data at high speed rates (e.g., DDRx/HBM/UCIe IO) (up to ×32); Write-verify may refer to a method of applying multiple write pulse to write data into a storage device or a storage portion thereof; Single-pulse Write may refer to a method of applying a single write pulse to write data into a storage device or a storage portion thereof; a Strong ECC may refer to a scheme designed to detect and correct errors affecting more than one bit in a data word using ECC; a Weak ECC may refer to a scheme designed to detect and correct single-bit errors or less (e.g., no correction); a High Energy Barrier of an MTJ may refer to 75 kBT, where kB is the Boltzmann constant and T is the temperature in degrees Kelvin, which may result in high data retention; and a Medium Energy Barrier of an MTJ may refer to 60 kBT.

With continued reference to Table 2, for the data storage portion, smaller MTJ size may correspond with lower switching current, which may be beneficial due to high density requirements of input data or input values stored in the data storage portion. BER issues that may arise in the data storage portion from using smaller MTJ size may be remedied using a stronger ECC scheme. Alternatively, for the data storage portion, larger MTJ size may be used if the density requirement for the data being stored (e.g., input data or input values) is not large.

As depicted in FIG. 3 as an example, the storage device 300 may include the code storage portion 302 and the weight storage portion 304. The code storage portion 302 and the weight storage portion 304 may be configured to support or have one or more of the characteristics included in the corresponding sections of Table 1 and Table 2 above.

Figure 4:
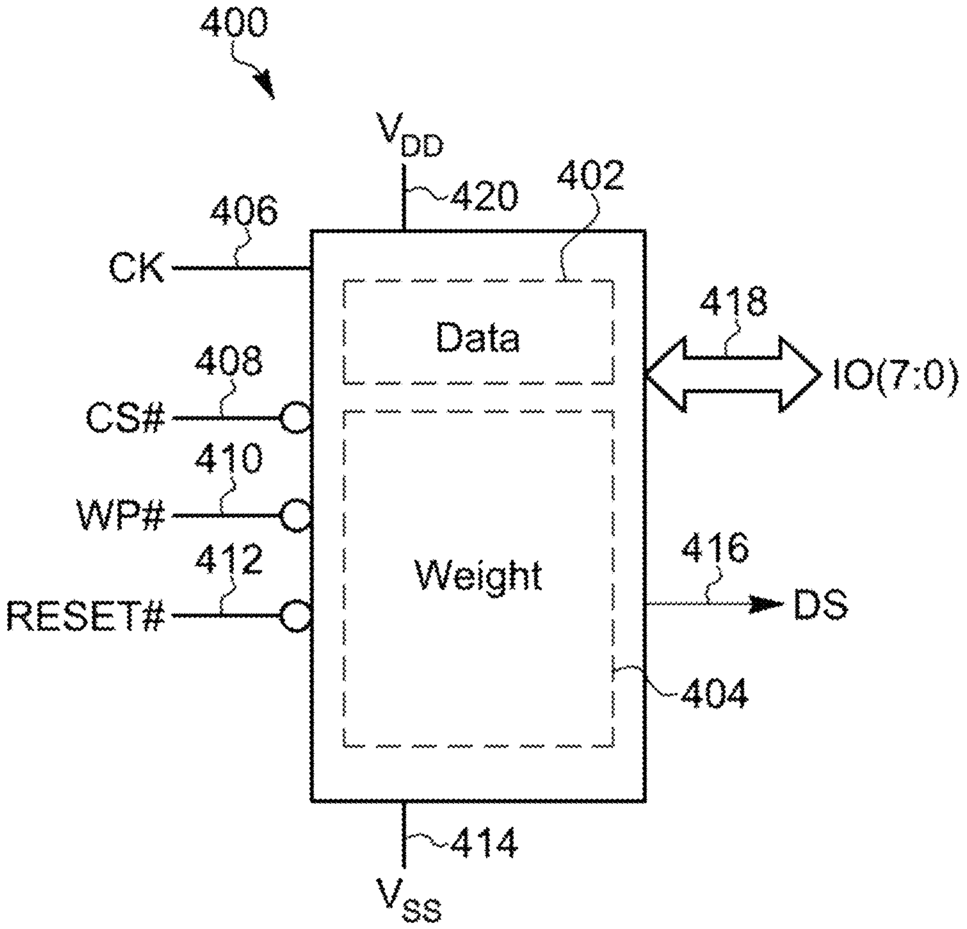
FIG. 4 depicts a storage device with a data storage portion and a weight storage portion, according to some example embodiments.

FIG. 4 depicts a storage device with a data storage portion and a weight storage portion, according to some example embodiments. Storage device 400 may be a memory chip including two or more storage portions, such as a first storage portion and a second storage portion. The storage device 400 may be the memory storage device discussed above with reference to FIG. 2. The storage device 400 may include a plurality of pins (406-420) that provide connections to and/or from the storage device 400, similar or identical to the ones discussed above with reference to the storage device 300 in FIG. 3.

The first storage portion may be a storage portion configured to store a first data type associated with an artificial neural network. The first storage portion may be configured to support, or have, a first set of storage characteristics. Similarly, the second storage portion may be a storage portion configured to store a second data type associated with an artificial neural network, and support or have a second set of storage characteristics. In one embodiment, the first storage portion may be a data storage portion 402 configured to store the input values 208*a* and 208*b*. In another embodiment, the first storage portion may be a data storage portion 402 configured to store the input values 208*a* and 208*b*, and the activation function output 222. The data storage portion 402 of the storage device 400 may also provide the stored input values 208*a* and 208*b* to the weight operation circuitry 204, and provide the stored activation function output 222 to the next layer. In one embodiment, the second storage portion may be a weight storage portion 404 configured to store the weight values 203*a* and 203*b*. In another embodiment, the second storage portion may be a weight storage portion 304 configured to store the weight values 203*a* and 203*b*, and the bias value 206. The weight storage portion 404 of the storage device 400 may also provide the stored weight values 203*a*, 203*b* and the stored bias value 206 to the weight operation circuitry 204 and the bias operation circuitry 207, respectively.

The storage device 400 may be a non-volatile memory device. The storage device 400 may be a magnetoresistive random-access memory (MRAM) device including a plurality of magnetic tunnel junctions (MTJs), but embodiments are not limited thereto. For example, in some embodiments, the data storage portion 402 may be a dynamic random access memory (DRAM), while the weight storage portion 404 may be an MRAM device.

As discussed above, Table 1 and Table 2 above include storage characteristics of the storage portions included in the storage device 400. Particularly, each storage portion of the storage device 400 may be configured to meet a set of performance specifications as illustrated in Table 1, and may be architected and configured with specific elements or schemes as illustrated in Table 2 to meet the performance specifications set for the corresponding storage portion.

Figure 5:
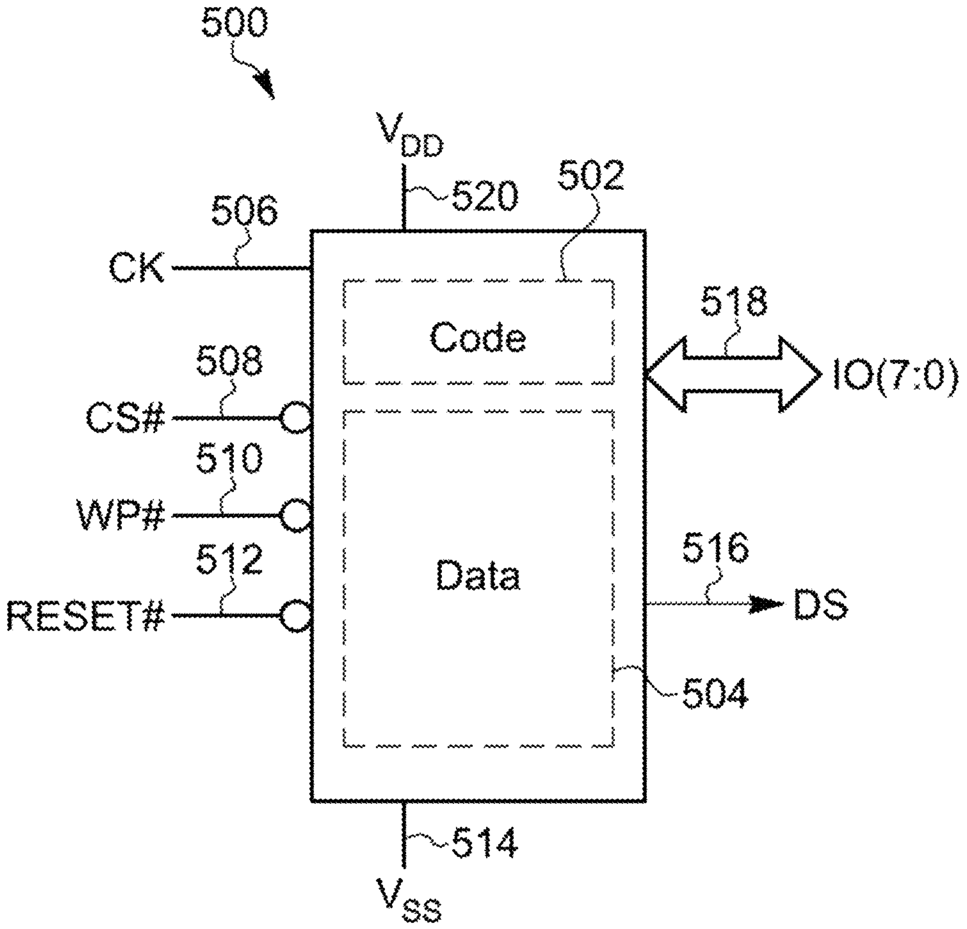
FIG. 5 depicts a storage device with a code storage portion and a data storage portion, according to some example embodiments.

FIG. 5 depicts a storage device with a code storage portion and a data storage portion, according to some example embodiments. Storage device 500 may be a memory chip including two or more storage portions, such as a first storage portion and a second storage portion. The storage device 500 may be the memory storage device discussed above with reference to FIG. 2. The storage device 500 may include a plurality of pins (506-520) that provide connections to and/or from the storage device 500, similar or identical to the ones discussed above with reference to the storage device 300 in FIG. 3.

The first storage portion may be a storage portion configured to store a first data type associated with an artificial neural network. The first storage portion may be configured to support, or have, a first set of storage characteristics. Similarly, the second storage portion may be a storage portion configured to store a second data type associated with an artificial neural network, and support or have a second set of storage characteristics. In one embodiment, the first storage portion may be a code storage portion 502 configured to store code data, which may include instructions to be performed by one or more processors of the artificial neural network device. The second storage portion may be a data storage portion 504 configured to store the input values 208*a* and 208*b*, but embodiments are not limited thereto. For example, the data storage portion 504 may be configured to store the input values 208*a* and 208*b*, and the activation function output 222. The data storage portion 504 of the storage device 500 may also provide the stored input values 208*a* and 208*b* to the weight operation circuitry 204, and provide the stored activation function output 222 to the next layer.

The storage device 500 may be a non-volatile memory device. The storage device 400 may be a magnetoresistive random-access memory (MRAM) device, including a plurality of magnetic tunnel junctions (MTJs), but embodiments are not limited thereto. For example, in some embodiments, the data storage portion 504 may be a dynamic random access memory (DRAM), while the code storage portion 502 may be an MRAM device.

As discussed above, Table 1 and Table 2 above include storage characteristics of the storage portions included in the storage device 500. Particularly, each storage portion of the storage device 500 may be configured to meet a set of performance specifications as illustrated in Table 1, and may be architected and configured with specific elements or schemes as illustrated in Table 2 to meet the performance specifications set for the corresponding storage portion.

Figure 6:
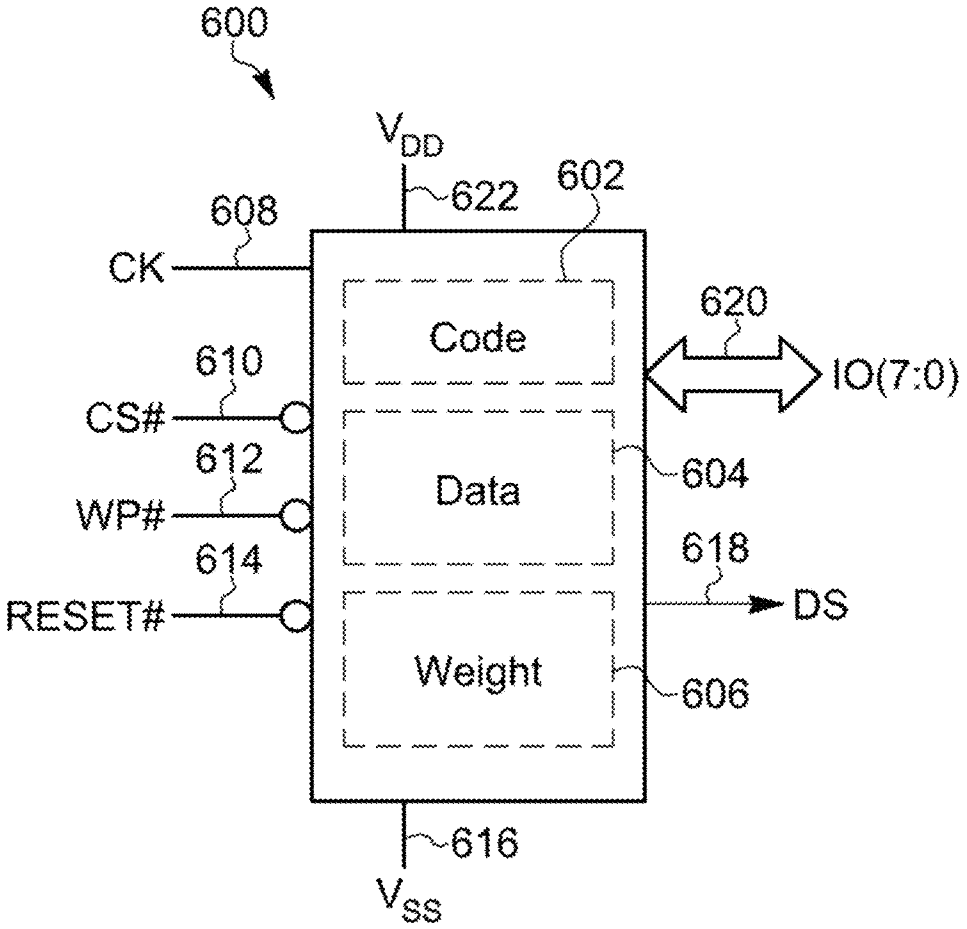
FIG. 6 depicts a storage device with a code storage portion, a data storage portion, and weight storage portion, according to some example embodiments.

FIG. 6 depicts a storage device with a code storage portion, a data storage portion, and weight storage portion, according to some example embodiments. Storage device 600 may be a memory chip including two or more storage portions, such as a first storage portion, a second storage portion, and a third storage portion. The storage device 600 may be the memory storage device discussed above with reference to FIG. 2. The storage device 600 may include a plurality of pins (608-622) that provide connections to and/or from the storage device 600, similar or identical to the ones discussed above with reference to the storage device 300 in FIG. 3.

The first storage portion may be a storage portion configured to store a first data type associated with an artificial neural network. The first storage portion may be configured to support, or have, a first set of storage characteristics. Similarly, the second storage portion may be a storage portion configured to store a second data type associated with an artificial neural network and support or have a second set of storage characteristics, and the third storage portion may be a storage portion configured to store a third data type associated with an artificial neural network and support and/or have a third set of storage characteristics. In one embodiment, the first storage portion may be a code storage portion 602 configured to store code data, which may include instructions to be performed by one or more processors of the artificial neural network device. The second storage portion may be a data storage portion 604 configured to store the input values 208*a* and 208*b*, but embodiments are not limited thereto. For example, the data storage portion 604 may be configured to store the input values 208*a* and 208*b*, and the activation function output 222. The data storage portion 604 of the storage device 600 may also provide the stored input values 208*a* and 208*b* to the weight operation circuitry 204, and provide the stored activation function output 222 to the next layer. The third storage portion may be a weight storage portion 606 configured to store the weight values 203*a* and 203*b*. In another embodiment, the third storage portion may be a weight storage portion 606 configured to store the weight values 203*a* and 203*b*, and the bias value 206. The weight storage portion 606 of the storage device 600 may also provide the stored weight values 203*a*, 203*b* and the stored bias value 206 to the weight operation circuitry 204 and the bias operation circuitry 207, respectively.

The storage device 600 may be a non-volatile memory device. The storage device 600 may be a magnetoresistive random-access memory (MRAM) device including a plurality of magnetic tunnel junctions (MTJs), but embodiments are not limited thereto. For example, in some embodiments, the data storage portion 604 may be a dynamic random access memory (DRAM), while the weight storage portion 606 and the code storage portion 602 may be an MRAM device.

As discussed above, Table 1 and Table 2 above include storage characteristics of the storage portions included in the storage device 600. Particularly, each storage portion of the storage device 600 may be configured to meet a set of performance specifications as illustrated in Table 1, and may be architected and configured with specific elements or schemes as illustrated in Table 2 to meet the performance specifications set for the corresponding storage portion.

Figure 7:
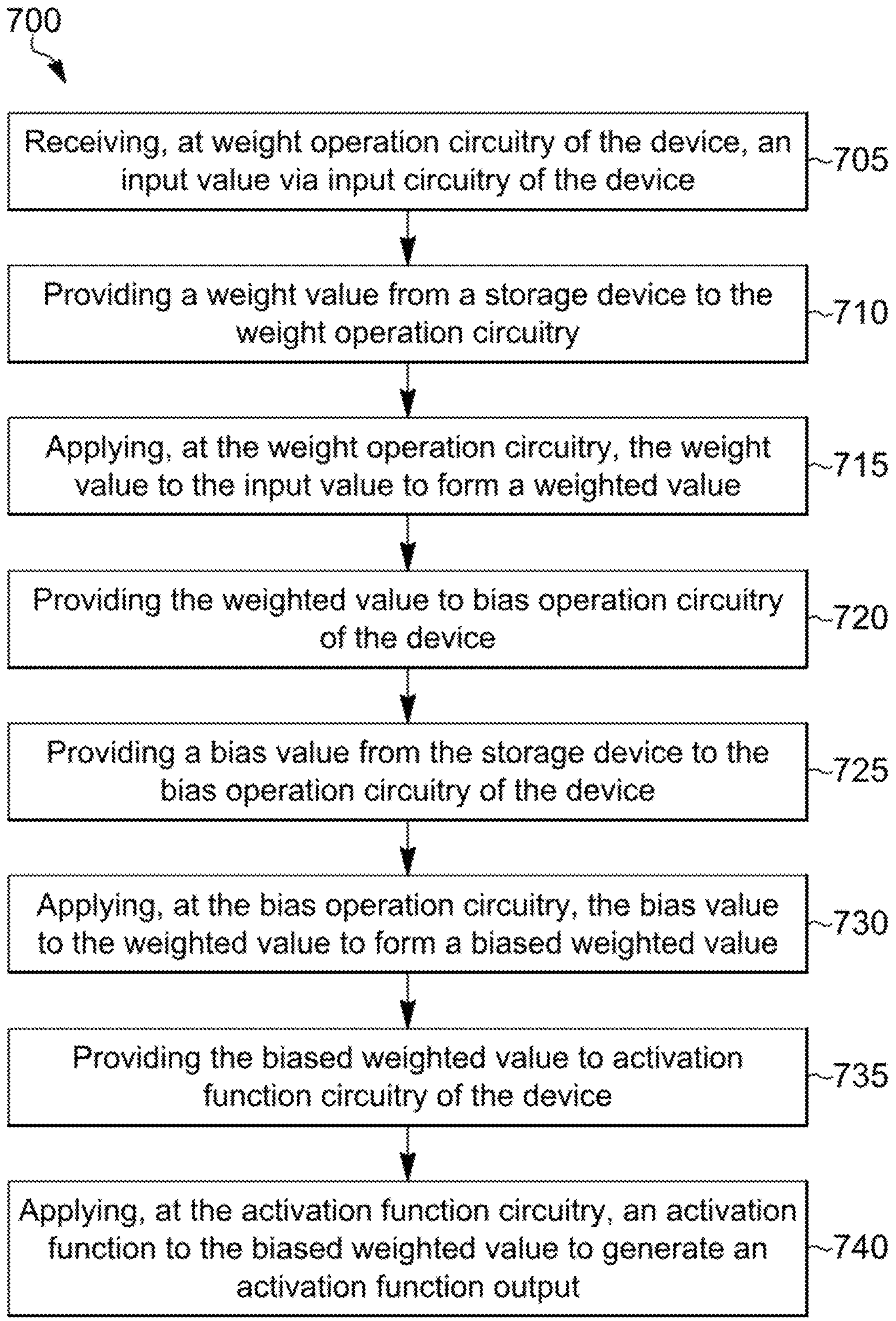
FIG. 7 depicts a flowchart for an exemplary method for operating a device of an artificial neural network, according to some example embodiments.

FIG. 7 depicts a flowchart for an exemplary method for operating a device of an artificial neural network, according to some example embodiments. For example, method 700 may use a hardware neuron 200 in connection with operation of an artificial neural network 100. The method 700 for operating a device of an artificial neural network based on code data may include the operations (or steps) illustrated in FIG. 7, but embodiments are not limited thereto. For example, the method 700 may include more or less operations and/or may include a different order of operations than what is illustrated in FIG. 7. In the following description, reference will be made to one or more elements described above with reference to FIGS. 1-6.

In step 705, the method 700 may include receiving, at weight operation circuitry of the device, an input value via input circuitry of the device. For example, the hardware neuron 200 may receive, at the weight operation circuitry 204, the input values 208*a* and 208*b* via the weight operation circuitry 204 (and/or via an input circuitry not depicted in FIG. 2). In one embodiment, the hardware neuron 200 may receive the input values 208*a* and 208*b* as part of a training process for the artificial neural network 100, and may receive various additional input values throughout the training process. In other embodiments, the hardware neuron 200 may receive the input value 208*a* and 208*b* as part of an inference process (e.g., production phase) for the artificial neural network 100.

In step 710, the method 700 may include providing a weight value from a storage device, or a weight storage portion of a storage device, to the weight operation circuitry. For example, the storage device 300, 400, or 600 may provide the weight values 203*a* and 203*b* from its weight storage portion to the weight operation circuitry 204. In step 715, the method 700 may include applying, at the weight operation circuitry, the weight value to the input value to form a weighted value. For example, at the weight operation circuitry 204, the weight values 203*a* and 203*b* may be multiplied by the input values 208*a* and 208*b* to form a weighted value. In step 720, the method 700 may include providing the weighted value to bias operation circuitry of the device. For example, the bias operation circuitry 207 may receive the weighted value from the weight operation circuitry 204.

In step 725, the method 700 may include providing a bias value from the storage device, or a weight storage portion of the storage device, to the bias operation circuitry of the device. For example, the storage device 300, 400, or 600 may provide the bias value 206 from its weight storage portion to the weight operation circuitry 204. In step 730, the method 700 may include applying, at the bias operation circuitry, the bias value to the weighted value to form a biased weighted value. For example, at the bias operation circuitry 207, the bias value 206 may be added to the weighted value to form the biased weighted value 215. In step 735, the method 700 may include providing the biased weighted value to activation function circuitry of the device. For example, the biased weighted value 215 may be output by the bias operation circuitry 207 to the activation function circuitry 220. In step 740, the method 700 may include applying, at the activation function circuitry, an activation function to the biased weighted value to generate an activation function output. For example, the activation function circuitry 220 may apply an activation function to the biased weighted value 215 to generate the activation function output 222, which may then be output to a subsequent layer or the output layer 106. The activation function output 22 may be stored in a data storage portion of the storage device.

In some embodiments, prior to or during the performance of the steps illustrated in FIG. 7, at least a portion of the code data including instructions to be performed by one or more processors of the device of the artificial neural network may be received from the storage device or a code storage portion of the storage device, in order to execute the functions associated with the artificial neural network.

Some embodiments disclosed herein may provide an MRAM memory device (or a storage device) with multiple portions of memory space (or storage space) that may be allocated for different storage space categories, such as a code storage portion, a data storage portion and/or a weight storage portion. Some embodiments may include MRAM memory chip with a large density option such as, for example, up to 128 MB, but embodiments are not limited thereto. Some embodiments may include a fast write and read bandwidth (BW) of 400 MB/s, which may be suitable for fast update and/or download, but embodiments are not limited thereto.

In some embodiments, the storage device discussed in the current disclosure may include unlimited endurance, which may enable both inference and training operations. In some embodiments, unified memory usage for code, data, and weight storage may be achieved. In some embodiments, the storage device discussed in the current disclosure may include independent memory spaces (e.g., storage portions) allocated for any combination of two or more storage space categories for code storage, data storage, or weight storage. For example, a memory device (or a storage device) may include a code storage and weight storage being allocated on the memory chip, or the memory chip may be allocated with weight storage and data storage, or the memory chip may be allocated with code storage and data storage, or the memory chip may be allocated with code storage, data storage, and weight storage, but embodiments are not limited thereto.

In some embodiments, the memory chip may include just one storage space category for code storage, data storage, or weight storage (e.g., any storage space category may be omitted from the memory chip). In some embodiments, a storage device may include MRAM memory architecture configured to reduce memory access power consumption and delay by providing a non-volatile memory solution with MRAM integrated into, or proximate, the AI processing chip.

In general, any process or operation discussed in this disclosure that is understood to be computer-implementable, such as the flows and/or process discussed herein (e.g., in FIGS. 1-7), etc., may be performed by one or more processors of a computer system, such any systems or devices used to implement the techniques disclosed herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

In one embodiment, the present disclosure is drawn to an artificial neural network device, including input circuitry configured to provide input data into a neuron; weight operation circuitry electrically connected to the input circuitry, the weight operation circuitry configured to input a weight value into the neuron; bias operation circuitry electrically connected to the weight operation circuitry, the bias operation circuitry configured to input a bias value into the neuron; activation function circuitry electrically connected to the bias operation circuitry, the activation function circuitry configured to receive an output of the bias operation circuitry and output an activation function output; and a storage device including storage circuitry electrically connected to the weight operation circuitry, the bias operation circuitry, and the activation function circuitry, wherein the input circuitry, the weight operation circuitry, the bias operation circuitry, and the activation function circuitry are operated based on code data, and wherein the storage device includes a plurality of storage portions, each storage portion of the plurality of storage portions configured to store one or more of the code data, the input data, the weight value, the bias value, or the activation function output.

Various aspects of the present disclosure may include one or more of the following features: wherein the storage device is a magnetoresistive random-access memory (MRAM) device; wherein the plurality of storage portions includes a code storage portion, a data storage portion, and a weight storage portion, wherein the code storage portion is configured to store the code data, wherein the data storage portion is configured to store one or more of the input data or the activation function output, and wherein the weight storage portion is configured to store one or more of the weight value or the bias value; wherein the plurality of storage portions includes a code storage portion configured to store the code data and support one or more of: an unlimited read endurance; a medium write endurance; a very low bit error rate; a fast read rate; or a slow write rate; wherein the plurality of storage portions includes a data storage portion configured to store one or more of the input data or the activation function output and support one or more of: an unlimited read endurance; a high write endurance; a very low bit error rate; a fast read rate; or a fast write rate; wherein the plurality of storage portions includes a weight storage portion configured to store one or more of the weight value or the bias value and support one or more of: an unlimited read endurance; a low write endurance; a medium bit error rate; a fast read rate; or a slow write rate; wherein the plurality of storage portions includes a weight storage portion configured to support a low write endurance, the low write endurance including a first number of write cycles associated with an inference operation and a second number of write cycles associated with a re-training operation, wherein the first number of write cycles is larger than the second number of write cycles; wherein the plurality of storage portions includes two or more of a code storage portion, a data storage portion, or a weight storage portion, wherein the data storage portion includes a dynamic random access memory (DRAM), and wherein the code storage portion and the weight storage portion include a magnetoresistive random-access memory (MRAM); wherein the plurality of storage portions includes a code storage portion, a data storage portion, and a weight storage portion, and wherein the data storage portion, the code storage portion, and the weight storage portion each include a plurality of magnetic tunnel junctions (MTJs); wherein the plurality of storage portions includes a code storage portion configured to store the code data and support one or more of: a parallel IO memory scheme, a serial IO memory scheme, or a high speed IO memory scheme; a write-verify write scheme; an error correction code (ECC) scheme with at least two-bit error correction; or a magnetic tunnel junction (MTJ) having a high energy barrier; wherein the plurality of storage portions includes a data storage portion configured to store one or more of the input data or the activation function output and support one or more of: a parallel IO memory scheme, a serial IO memory scheme, or a high speed IO memory scheme; a single pulse write scheme; an error correction code (ECC) scheme with at least two-bit error correction; or a magnetic tunnel junction (MTJ) having a medium energy barrier; wherein the plurality of storage portions includes a weight storage portion configured to store one or more of the weight value or the bias value and support one or more of: a wide IO memory scheme; a write-verify write scheme; no error correction code (ECC) scheme or an ECC scheme with a one-bit error correction; or a magnetic tunnel junction (MTJ) having a high energy barrier; and/or wherein the storage device is integrated into or disposed proximate a chip including the input circuitry, the weight operation circuitry, the bias operation circuitry, and the activation function circuitry.

In another embodiment, the present disclosure is drawn to a device configured to store data associated with an artificial neural network, the device including a first storage portion configured to store a first data type associated with the artificial neural network and support a first set of storage characteristics; and a second storage portion configured to store a second data type associated with the artificial neural network and support a second set of storage characteristics, wherein the first set of storage characteristics and the second set of storage characteristics are different.

Various aspects of the present disclosure may include one or more of: wherein each of the first data type and the second data type includes code data, input data, or weight and bias data, and wherein the first data type and the second data type are different; wherein each of the first set of storage characteristics and the second set of storage characteristics includes one or more of storage performance specifications, an input/output (I/O) scheme, a write scheme, an error correction code (ECC) scheme, or storage bit characteristics; wherein the first data type includes code data and the second data type includes weight and bias data; wherein the device includes a magnetoresistive random-access memory (MRAM); and/or a third storage portion configured to store a third data type associated with the artificial neural network and support a third set of storage characteristics, wherein the first set, the second set, and the third set of storage characteristics are different from each other.

In yet another embodiment, the present disclosure is drawn to a method of operating a device of an artificial neural network based on code data, the method including: receiving, at weight operation circuitry of the device, an input value via input circuitry of the device; providing a weight value from a storage device to the weight operation circuitry; applying, at the weight operation circuitry, the weight value to the input value to form a weighted value; providing the weighted value to bias operation circuitry of the device; providing a bias value from the storage device to the bias operation circuitry of the device; applying, at the bias operation circuitry, the bias value to the weighted value to form a biased weighted value; providing the biased weighted value to activation function circuitry of the device; and applying, at the activation function circuitry, an activation function to the biased weighted value to generate an activation function output, wherein the storage device includes a plurality of storage portions, each storage portion of the plurality of storage portions configured to store one or more of the code data, the input value, the weight value, the bias value, or the activation function output, and wherein the storage device is integrated into or disposed proximate a chip including the input circuitry, the weight operation circuitry, the bias operation circuitry, and the activation function circuitry.

While exemplary embodiments have been presented above, it should be appreciated that many variations exist. Furthermore, while the description includes references to MRAM devices, the teachings may be applied to other memory devices having different architectures in which the same concepts can be applied. Thus, the particular embodiments disclosed above are illustrative only and should not be taken as limitations, as the embodiments may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the inventions as defined by the appended claims so that those skilled in the art should understand that they can make various changes, substitutions and alterations without departing from the spirit and scope of the inventions in their broadest form.

The foregoing description of the inventions has been described for purposes of clarity and understanding. It is not intended to limit the inventions to the precise form disclosed. Various modifications may be possible within the scope and equivalence of the application.

We claim:

1. An artificial neural network device, comprising:

input circuitry configured to provide input data into a neuron;

weight operation circuitry electrically connected to the input circuitry, the weight operation circuitry configured to input a weight value into the neuron;

bias operation circuitry electrically connected to the weight operation circuitry, the bias operation circuitry configured to input a bias value into the neuron;

activation function circuitry electrically connected to the bias operation circuitry, the activation function circuitry configured to receive an output of the bias operation circuitry and output an activation function output; and a storage device including storage circuitry electrically connected to the weight operation circuitry, the bias operation circuitry, and the activation function circuitry, wherein the input circuitry, the weight operation circuitry, the bias operation circuitry, and the activation function circuitry are operated based on code data, wherein the storage device includes a plurality of storage portions, each storage portion of the plurality of storage portions configured to store one or more of the code data, the input data, the weight value, the bias value, or the activation function output, wherein the plurality of storage portions includes two or more of a code storage portion, a data storage portion, or a weight storage portion, wherein the data storage portion includes a dynamic random access memory (DRAM), wherein the code storage portion and the weight storage portion include a magnetoresistive random-access memory (MRAM), and wherein the storage device is integrated into or disposed proximate a chip including the input circuitry, the weight operation circuitry, the bias operation circuitry, and the activation function circuitry.

2. The artificial neural network device of claim 1, wherein the storage device is a magnetoresistive random-access memory (MRAM) device.

3. The artificial neural network device of claim 1, wherein the plurality of storage portions includes a code storage portion, a data storage portion, and a weight storage portion, wherein the code storage portion is configured to store the code data, wherein the data storage portion is configured to store one or more of the input data or the activation function output, and wherein the weight storage portion is configured to store one or more of the weight value or the bias value.

4. The artificial neural network device of claim 1, wherein the plurality of storage portions includes a code storage portion configured to store the code data and support one or more of:

an unlimited read endurance;
a medium write endurance;
a very low bit error rate;
a fast read rate; or
a slow write rate.

5. The artificial neural network device of claim 1, wherein the plurality of storage portions includes a data storage portion configured to store one or more of the input data or the activation function output and support one or more of:

an unlimited read endurance;
a high write endurance;
a very low bit error rate;
a fast read rate; or
a fast write rate.

6. The artificial neural network device of claim 1, wherein the plurality of storage portions includes a weight storage portion configured to store one or more of the weight value or the bias value and support one or more of:

an unlimited read endurance;
a low write endurance;
a medium bit error rate;
a fast read rate; or
a slow write rate.

7. The artificial neural network device of claim 1, wherein the plurality of storage portions includes the weight storage portion configured to support a low write endurance, the low write endurance including a first number of write cycles associated with an inference operation and a second number of write cycles associated with a re-training operation, wherein the first number of write cycles is larger than the second number of write cycles.

8. The artificial neural network device of claim 1, wherein the plurality of storage portions includes the code storage portion, the data storage portion, and the weight storage portion, and wherein the data storage portion, the code storage portion, and the weight storage portion each include a plurality of magnetic tunnel junctions (MTJs).

9. The artificial neural network device of claim 1, wherein the code storage portion is configured to store the code data and support one or more of:

a parallel IO memory scheme, a serial IO memory scheme, or a high speed IO memory scheme;
a write-verify write scheme;
an error correction code (ECC) scheme with at least two-bit error correction; or
a magnetic tunnel junction (MTJ) having a high energy barrier.

10. The artificial neural network device of claim 1, wherein the data storage portion is configured to store one or more of the input data or the activation function output and support one or more of:

a parallel IO memory scheme, a serial IO memory scheme, or a high speed IO memory scheme;
a single pulse write scheme;
an error correction code (ECC) scheme with at least two-bit error correction; or
a magnetic tunnel junction (MTJ) having a medium energy barrier.

11. The artificial neural network device of claim 1, wherein the weight storage portion is configured to store one or more of the weight value or the bias value and support one or more of:

a wide IO memory scheme;
a write-verify write scheme;
no error correction code (ECC) scheme or an ECC scheme with a one-bit error correction; or
a magnetic tunnel junction (MTJ) having a high energy barrier.

12. A device configured to store data associated with an artificial neural network, the device comprising:

a first storage portion configured to store a first data type associated with the artificial neural network and support a first set of storage characteristics; and a second storage portion configured to store a second data type associated with the artificial neural network and support a second set of storage characteristics, wherein the first set of storage characteristics and the second set of storage characteristics are different, wherein the first storage portion and the second storage portion include two or more of a code storage portion, a data storage portion, or a weight storage portion, wherein the data storage portion includes a dynamic random access memory (DRAM), wherein the code storage portion and the weight storage portion include a magnetoresistive random-access memory (MRAM), and wherein the first storage portion and the second storage portion are integrated into or disposed proximate a chip including an input circuitry, a weight operation circuitry, a bias operation circuitry, and an activation function circuitry.

13. The device of claim 12, wherein each of the first data type and the second data type includes code data, input data, or weight and bias data, and wherein the first data type and the second data type are different.

14. The device of claim 12, wherein each of the first set of storage characteristics and the second set of storage characteristics includes one or more of storage performance specifications, an input/output (I/O) scheme, a write scheme, an error correction code (ECC) scheme, or storage bit characteristics.

15. The device of claim 12, wherein the first data type includes code data and the second data type includes weight and bias data.

16. The device of claim 12, further comprising:

a third storage portion configured to store a third data type associated with the artificial neural network and support a third set of storage characteristics, wherein the first set, the second set, and the third set of storage characteristics are different from each other.

17. The device of claim 12, wherein the weight storage portion is configured to support a low write endurance, the low write endurance including a first number of write cycles associated with an inference operation and a second number of write cycles associated with a re-training operation, wherein the first number of write cycles is larger than the second number of write cycles.

18. The device of claim 12, wherein the data storage portion, the code storage portion, and the weight storage portion each include a plurality of magnetic tunnel junctions (MTJs).

19. The device of claim 12, wherein the code storage portion is configured to store a code data, wherein the data storage portion is configured to store one or more of an input data or an activation function output, and wherein the weight storage portion is configured to store one or more of a weight value or a bias value.

20. A method of operating a device of an artificial neural network based on code data, the method comprising:

receiving, at weight operation circuitry of the device, an input value via input circuitry of the device;

providing a weight value from a storage device to the weight operation circuitry;

applying, at the weight operation circuitry, the weight value to the input value to form a weighted value;

providing the weighted value to bias operation circuitry of the device;

providing a bias value from the storage device to the bias operation circuitry of the device;

applying, at the bias operation circuitry, the bias value to the weighted value to form a biased weighted value;

providing the biased weighted value to activation function circuitry of the device; and applying, at the activation function circuitry, an activation function to the biased weighted value to generate an activation function output, wherein the storage device includes a plurality of storage portions, each storage portion of the plurality of storage portions configured to store one or more of the code data, the input value, the weight value, the bias value, or the activation function output, wherein the plurality of storage portions include two or more of a code storage portion, a data storage portion, or a weight storage portion, wherein the data storage portion includes a dynamic random access memory (DRAM), wherein the code storage portion and the weight storage portion include a magnetoresistive random-access memory (MRAM), and wherein the storage device is integrated into or disposed proximate a chip including the input circuitry, the weight operation circuitry, the bias operation circuitry, and the activation function circuitry.

* * * * *